(12) United States Patent
Hinokimori et al.

(10) Patent No.: US 8,445,629 B2
(45) Date of Patent: *May 21, 2013

(54) METHOD FOR PRODUCING POLYARYLENE SULFIDE

(75) Inventors: Toshio Hinokimori, Ichihara (JP); Nobuhiko Yamauchi, Ichihara (JP); Takashi Furusawa, Ichihara (JP)

(73) Assignee: DIC Corporation, Tokyo (JP)

( * ) Notice: Subject to any disclaimer, the term of this patent is extended or adjusted under 35 U.S.C. 154(b) by 445 days.

This patent is subject to a terminal disclaimer.

(21) Appl. No.: 12/377,719

(22) PCT Filed: Aug. 7, 2007

(86) PCT No.: PCT/JP2007/065432

§ 371 (c)(1),
(2), (4) Date: Feb. 17, 2009

(87) PCT Pub. No.: WO2008/020553

PCT Pub. Date: Feb. 21, 2008

(65) Prior Publication Data

US 2010/0228003 A1 Sep. 9, 2010

(30) Foreign Application Priority Data

Aug. 17, 2006 (JP) .................. 2006-222404

(51) Int. Cl.
*C08G 75/14* (2006.01)
(52) U.S. Cl.
USPC ............ 528/388; 528/488; 528/489; 528/499

(58) Field of Classification Search
USPC .................. 528/388, 488, 489, 499
See application file for complete search history.

(56) References Cited

U.S. PATENT DOCUMENTS

| | | | |
|---|---|---|---|
| 5,109,110 A | 4/1992 | Ogata et al. | |
| 5,194,580 A | 3/1993 | Koyama et al. | |
| 7,115,704 B2 | 10/2006 | Horiuchi et al. | |
| 2004/0249118 A1* | 12/2004 | Kagoshima et al. | 528/388 |
| 2005/0043505 A1 | 2/2005 | Horiuchi et al. | |
| 2006/0074219 A1* | 4/2006 | Kawama et al. | 528/388 |

FOREIGN PATENT DOCUMENTS

| | | |
|---|---|---|
| EP | 0549977 A1 | 7/1993 |
| JP | 62-253622 A | 11/1987 |
| JP | 63305131 A | 12/1988 |
| JP | 02-107637 A | 4/1990 |
| JP | 02-151631 A | 6/1990 |
| JP | 4159329 A | 6/1992 |
| JP | 5170907 A | 7/1993 |
| JP | 5331288 A | 12/1993 |
| JP | 08-231723 A | 9/1996 |
| JP | 8283413 A | 10/1996 |
| JP | 2001040090 A | 2/2001 |
| JP | 2001181394 A | 7/2001 |
| JP | 2003-212997 A | 7/2003 |
| JP | 2005-054181 A | 3/2005 |

* cited by examiner

*Primary Examiner* — Shane Fang
(74) *Attorney, Agent, or Firm* — McDermott Will & Emery LLP

(57) ABSTRACT

A method for producing an acid group-containing polyarylene sulfide of the present invention includes a reaction step of reacting a polyhaloaromatic compound (a), an alkali metal hydrosulfide (b), and an alkali metal carboxylate (c) in the presence of a solid alkali metal sulfide and a lithium ion.

10 Claims, No Drawings

METHOD FOR PRODUCING POLYARYLENE SULFIDE

CROSS-REFERENCE TO PRIOR APPLICATION

This is the U.S. National Phase Application under 35 U.S.C. §371 of International Patent Application No. PCT/JP2007/065432 filed Aug. 7, 2007, which claims the benefit of Japanese Patent Application No. 2006-222404 filed Aug. 17, 2006, both of them are incorporated by reference herein. The International Application was published in Japanese on Feb. 21, 2008 as WO2008/020553 A1 under PCT Article 21(2).

TECHNICAL FIELD

The present invention relates to a method for producing a linear polyarylene sulfide having a high molecular weight resin with high efficiency.

BACKGROUND ART

Polyarylene sulfides (hereinafter abbreviated to "PAS") such as polyphenylene sulfide (hereinafter abbreviated to "PPS") has excellent heat resistance and chemical resistance, and is widely used for electric/electronic components, car components, water heater components, fibers, and films. In these respective applications, PAS having a high molecular weight is particularly highly desired in recent years in terms of the strength and moldability. PAS having a high molecular weight is generally produced by synthesizing PAS having a low molecular weight and subsequently subjecting it to thermally oxidative cross-linking. This PAS whose molecular weight is increased by the thermally oxidative cross-linking is usually difficult to be subjected to melt extrusion molding, and the application thereof has been limited.

Therefore, as a method for producing the linear PAS having a high molecular weight, for example, the method is known, in which a hydrous alkali metal sulfide, N-methylpyrrolidone whose amount is less than 1 mol per mol of the hydrous alkali metal sulfide, and a polyhaloaromatic compound are mixed, the mixture is dehydrated by azeotropy to thereby obtain the composition containing a microparticulated anhydrous alkali metal sulfide in a slurry form, the slurry is heated and polymerized to produce a linear PAS having a high molecular weight with good production efficiency (refer to Patent Document 1).

The aforementioned method can suppress side reactions and efficiently produce a linear PAS having a high molecular weight. However, because the starting materials are polymerized by a heterogeneous reaction that reacts them in a slurry form, the reactivity is not sufficient, and the recently desired level of the high molecular weight is not achieved.

Meanwhile, as a method for producing PAS having a high molecular weight and high quality, the method is known, in which a dihalogenated aromatic compound and the alkali metal sulfide are reacted in the presence of a lithium compound in a substantially anhydrous condition (refer to Patent Document 2).

However, according to the method in which a dihalogenated aromatic compound and the alkali metal sulfide are reacted in the presence of a lithium compound in a substantially anhydrous condition, a very expensive lithium compound needs to be used in a large amount, and therefore, this method is not economical in terms of industrial manufacture and is difficult to be turned into practical use. In addition, the reaction time is long, and the pressure inside the reaction system is extremely high. Therefore, PAS cannot be efficiently produced.

Patent Document 1
Japanese Unexamined Patent Application, First Publication No. Hei 8-231723
Patent Document 2
Japanese Unexamined Patent Application, First Publication No. Sho 62-253622

DISCLOSURE OF INVENTION

Problems to be Solved by the Invention

Thus, an object of the present invention is to provide a method for producing a polyarylene sulfide, in which the reactivity is significantly good, the industrial productivity is high, and the molecular weight of the obtained PAS can significantly increase.

Means to Solve the Problems

The present inventors have intensively studied to achieve the above objects and found that the reactivity in the polymerization step is significantly improved and also the molecular weight of the polymer can increase more than conventional ones even with the use of a small amount of an expensive lithium compound, when the method is used, in which a hydrous alkali metal sulfide is subjected to dehydration treatment in the presence of a small amount of a hydrolyzable polar solvent, to obtain a slurry containing a sulfiding agent component as a solid component; polymerization is conducted by reacting, in the slurry, a polyhaloaromatic compound with the sulfiding agent in the presence of a lithium ion; and then the polymerization for the PAS is performed. Thus, the present invention has been completed.

The present invention relates to a method for producing an acid group-containing polyarylene sulfide including a reaction step of reacting a polyhaloaromatic compound (a), an alkali metal hydrosulfide (b), and an alkali metal carboxylate (c) in the presence of a solid alkali metal sulfide and a lithium ion.

Effect of the Invention

The present invention can provide a method for producing a polyarylene sulfide, in which the reactivity is significantly good, the industrial productivity is high, and the molecular weight of the obtained PAS can significantly increase.

BEST MODE FOR CARRYING OUT THE INVENTION

The production method of the polyarylene sulfide of the present invention is characterized by reacting, in the presence of a solid alkali metal sulfide and a lithium ion, a polyhaloaromatic compound (a), an alkali metal hydrosulfide (b), and an alkali metal carboxylate (c) in a state of slurry. As described above, by conducting a heterogeneous reaction using a sulfiding agent as the solid component in the reaction system, a side reaction is suppressed, and thus the molecular weight of PAS can increase.

In the above reaction, the amount of the alkali metal carboxylate (c) is preferably within a range from 0.01 to 0.9 mol, and particularly preferably from 0.04 to 0.4 mol, per mol of a sulfur atom existing in the reaction system since the remarkable effect of suppressing a side reaction is exerted.

Specific examples of the alkali metal carboxylate (c) include lower aliphatic acid alkali metal salts such as formic acid, acetic acid, and propionic acid; aliphatic cyclic amide compounds such as N-methyl-2-pyrrolidone, N-cyclohexyl-2-pyrrolidone, 2-pyrrolidone, 1,3-dimethyl-2-imidazolidinone acid, ε-caprolactam, and N-methyl-ε-caprolactam; and alkali metal salts of hydrolysates of aliphatic cyclic compounds, which are capable of ring-opening by hydrolysis, such as sulfolanes such as sulfolane and dimethylsulfolane. Examples of the alkali metal salt include a lithium salt, a sodium salt, a potassium salt, a rubidium salt, and a cesium salt. It is preferred that the alkali metal carboxylate (c) be used in a liquid form in the reaction system.

Among these alkali metal carboxylates (c), an alkali metal salt (c2) of a hydrolysate of an aliphatic cyclic amide compound (c1) is preferred in terms of good reactivity, and an alkali metal salt of a ring-opened compound of an aliphatic cyclic amide compound, particularly an alkali metal salt of a hydrolysate of N-methyl-2-pyrrolidone, is preferred in terms of reactivity. In addition, these alkali metal salts are preferably used as a lithium salt or a sodium salt. When a lithium salt is used, it can be a lithium ion source. However, the present invention is characterized in that the excellent reactivity is exerted even with the use of a small amount of a lithium ion. In terms of such characteristics, it is preferred to use the method in which a sodium salt is used as the alkali metal ion, and a lithium ion is separately added in necessary amount.

As described above, the present invention is characterized in that the excellent reactivity is exerted even with the use of a small amount of a lithium ion. In specific, the amount of a lithium ion in a reaction system is preferably within a range from 0.01 to 0.9 mol, particularly preferably from 0.1 to 0.4 mol, per mol of a sulfur atom existing in the reaction system.

As described above, according to the method of the present invention, a reactive slurry, which contains, as essential components, a solid alkali metal sulfide, a polyhaloaromatic compound (a), an alkali metal hydrosulfide (b), an alkali metal carboxylate (c), and a lithium ion, is reacted to produce a polyarylene sulfide, and specific examples of the method include the following methods 1 to 3.

Method 1:

A method in which a commercially available solid alkali metal sulfide, an aliphatic cyclic compound (c1) that is capable of ring-opening by hydrolysis, water, and a non-hydrolyzable organic solvent are mixed and reacted to obtain a slurry containing a solid alkali metal sulfide, an alkali metal hydrosulfide (b), an alkali metal salt (c2) of a hydrolysate of an aliphatic cyclic compound (c1) that is capable of ring-opening by hydrolysis, and a non-hydrolyzable organic solvent (hereinafter the slurry is abbreviated as a "slurry (I)"), and the polymerization is performed by reacting, in the slurry (I), the polyhaloaromatic compound (a) and the alkali metal hydrosulfide (b) in the presence of a lithium ion.

Method 2:

A method in which hydrogen sulfide and an alkali metal hydroxide is reacted in a reaction vessel to obtain a hydrous alkali metal sulfide, the aliphatic cyclic compound (c1) and a non-hydrolyzable organic solvent are added thereto followed by subjecting it to thermal dehydration to prepare a slurry (I), and the polymerization is performed by reacting, in the slurry (I), the polyhaloaromatic compound (a) and the alkali metal hydrosulfide (b) in the presence of a lithium ion.

Method 3:

A method including, as essential production steps, the following steps 1 and 2: the step 1 of:

reacting, while dehydrating, a hydrous alkali metal sulfide, or an alkali metal hydrosulfide and an alkali metal hydroxide, an aliphatic cyclic compound (c1) that is capable of ring-opening by hydrolysis, and a non-hydrolyzable organic solvent, to produce a slurry (I); and subsequently the step 2 of:

reacting, in the slurry (I), a polyhaloaromatic compound (a), the alkali metal hydrosulfide (b), and an alkali metal salt (c2) of a hydrolysate of the compound (c1) in the presence of a lithium ion, to perform polymerization.

In the respective methods 1 to 3, examples of the introduction method of a lithium ion into a slurry (I) include an introduction method in which a lithium compound is used as the solid alkali metal sulfide, alkali metal hydroxide, the hydrous alkali metal sulfide, or hydrous alkali metal hydrosulfide; an introduction method in which a lithium salt compound that is capable of releasing lithium ions is added into the reaction system at any stage of the preparation of the slurry (I) or after the preparation. Among these, the latter introduction method is preferred since the effects of the present invention are remarkably exerted.

The non-hydrolyzable organic solvent used in the methods 1 to 3 may be any organic solvent as long as it is inert to water, and examples thereof include versatile aliphatic hydrocarbons, aromatic hydrocarbons, or the polyhaloaromatic compound (a). In the present invention, it is preferred to use the polyhaloaromatic compound (a) as an organic solvent since it is not necessary to separately add the polyhaloaromatic compound (a) to the reaction system after preparing the slurry (I) and the productivity is improved.

The alkali metal hydrosulfide (b) in the respective methods described above is produced by reaction of a solid alkali metal sulfide with water and exists in the slurry (I) in the method 1. In the method 2, it is produced by thermal dehydration of the hydrous alkali metal sulfide and exists in the slurry (I). In the method 3, it is produced by thermal dehydration of the hydrous alkali metal sulfide, or reaction of the hydrous alkali metal sulfide with alkali metal hydroxide, and exists in the slurry (I).

Among these methods 1 to 3, the method 3 is particularly preferred in the present invention since it is easy to prepare the slurry and the remarkable effect of increasing the molecular weight of a polyarylene sulfide are exerted by suppression of the side reaction. The method 3 will now be described in detail.

Specific examples of the method for producing the slurry (I) in the step 1 of the method 3 include the following methods 3-A and 3-B.

The method 3-A of:

subjecting the hydrous alkali metal sulfide, the aliphatic cyclic compound (c1), and the non-hydrolyzable organic solvent to thermal dehydration, to obtain the slurry (I) containing the solid alkali metal sulfide, the alkali metal hydrosulfide (b), the alkali metal salt (c2) of the hydrolysate of the aliphatic cyclic compound (c1) that is capable of ring-opening by hydrolysis, and the non-hydrolyzable organic solvent.

The method 3-B of:

subjecting the hydrous alkali metal hydrosulfide, the alkali metal hydroxide, the aliphatic cyclic compound (c1), and the non-hydrolyzable organic solvent to thermal dehydration, to obtain the slurry (I) containing the solid alkali metal sulfide, the alkali metal hydrosulfide (b), the alkali metal salt (c2) of the hydrolysate of the aliphatic cyclic compound (c1) that is capable of ring-opening by hydrolysis, and the non-hydrolyzable organic solvent.

In the step 1 of the method 3-A and 3-B, the amount of the aliphatic cyclic compound (c1) that is capable of ring opening by hydrolysis is adjusted based on the amount of the hydrous alkali metal sulfide (method 3-A) or the hydrous alkali metal hydrosulfide (method 3-B) to thereby enable the adjustment of the solid content of the alkali metal sulfide and the amount of the hydrolysate of the aliphatic cyclic compound (c1) in the slurry (I). In other words, the step 1 is a step of removing, out of the reaction system, water to be produced as a by-product during producing the solid alkali metal sulfide, and also hydrolyzing the aliphatic cyclic compound (c1) to form an alkali metal hydrosulfide (b), as shown in the following scheme (1).

Step 1: Dehydration Reaction

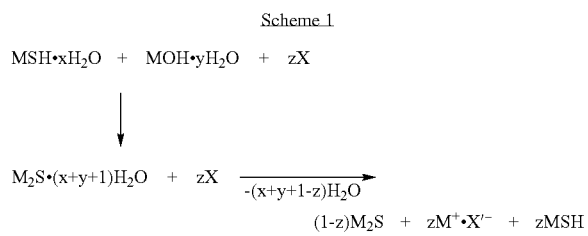

Scheme 1

In the formula (1), x and y represent the numbers that satisfy the equation: $(x+y)=0.1$ to $30$, z represents the number that is less than an equivalent of $MSH \cdot xH_2O$, and preferably within a range from 0.01 to 0.9, M represents an alkali metal atom, X represents a compound (c1), and X' represents a hydrolysate thereof.

Therefore, when the aliphatic cyclic compound (c1) that is capable of ring-opening by hydrolysis is used in the amount of 0.01 to 0.9 mol per mol of the hydrous alkali metal sulfide (method 3-A) or hydrous alkali metal hydrosulfide (method 3-B), the alkali metal sulfide is precipitated in a solid form, and the objective slurry (I) is obtained.

Accordingly, by adjusting the amount of the aliphatic cyclic compound (c1) to be charged in the step 1, it is possible to adjust the amount of the alkali metal sulfide as a solid component in the reaction system and the amount of the alkali metal hydrosulfide (b). The present invention is characterized by allowing the alkali metal sulfide to be present in a solid form in the slurry, and performing a heterogeneous reaction in the slurry state in the step 2, thereby reducing the amount of the alkali metal salt of the hydrolysate of the aliphatic cyclic compound (c1), suppressing the side reaction during polymerization of the PAS, and enabling the molecular weight to be increased. Therefore, it is preferred that the amount of the aliphatic cyclic compound (c1) to be charged in the step 1 is less than an equivalent of the hydrous alkali metal sulfide (method 3-A) or the hydrous alkali hydrosulfide (method 3-B). Among these, it is more preferred to use in the amount of 0.01 to 0.9 mol per mol of the hydrous alkali metal hydrosulfide. It is particularly preferred to use in the amount of 0.04 to 0.4 mol per mol of the hydrous alkali metal hydrosulfide since these effects are remarkably exerted.

Examples of the aliphatic cyclic compound (c1) that is capable of ring opening by hydrolysis, which can be used herein, include aliphatic cyclic amide compounds such as N-methyl-2-pyrollidone (hereinafter, abbreviated as "NMP"), N-cyclohexyl-2-pyrrolidone, 2-pyrollidone, 1,3-dimethyl-2-imidazolidonone acid, ε-caprolactam, and N-methyl-ε-caprolactam; and sulfolanes such as sulfolane and dimethylsulfolane. Among these compounds, aliphatic cyclic amide compounds are preferred and NMP is particularly preferred.

The non-hydrolyzable organic solvent used in the step 1 can be, as described above, any organic solvents as long as it is inert to water, and thus versatile aliphatic hydrocarbons and aromatic hydrocarbons can be used. In the present invention, it is particularly preferred to use the polyhaloaromatic compound (a), which is subjected to the reaction in the step 2, as an organic solvent since the use thereof enhances the reaction and polymerization in the following step 2 and thus production efficiency is dramatically improved.

Examples of the polyhaloaromatic compound (a) used herein include p-dihalobenzene, m-dihalobenzene, o-dihalobenzene, 1,2,3-trihalobenzene, 1,2,4-trihalobenzene, 1,3,5-trihalobenzene, 1,2,3,5-tetrahalobenzene, 1,2,4,5-tetrahalobenzene, 1,4,6-trihalonaphthalene, 2,5-dihalotoluene, 1,4-dihalonaphthalene, 1-methoxy-2,5-dihalobenzene, 4,4'-dihalobiphenyl, 3,5-dihalobenzoic acid, 2,4-dihalobenzoic acid, 2,5-dihalonitrobenzene, 2,4-dihalonitrobenzene, 2,4-dihaloanisole, p,p'-dihalodiphenyl ether, 4,4'-dihalobenzophenone, 4,4'-dihalodiphenylsulfone, 4,4'-dihalodiphenyl sulfoxide, 4,4'-dihalodiphenyl sulfide, and a compound having an alkyl group of 1 to 18 carbon atoms as a nuclear substituent on the aromatic ring of the compound. Further, it is preferred that the halogen atom contained in the above respective compounds is a chlorine or bromine atom.

In the present invention, a difunctional dihaloaromatic compound is preferred since a linear PAS having a high molecular weight can be efficiently produced in the present invention. Among these, p-dichlorobenzene, m-dichlorobenzene, 4,4'-dichlorobenzophenone and 4,4'-dichlorodiphenylsulfone are preferable since the PAS obtained finally has excellent mechanical strength and moldability, and p-dichlorobenzene is particularly preferred. To obtain a linear PAS with a polymer structure having partially blanched structure, it is preferred to use 1,2,3-trihalobenzene, 1,2,4-trihalobenzene, or 1,3,5-trihalobenzene partially in combination with the dihaloaromatic compound.

The amount of the non-hydrolyzable organic solvent is not particularly limited, but is preferably within a range from 0.2 to 5.0 mol, and particularly preferably from 0.3 to 2.0 mol, per mol of the hydrous alkali metal hydrosulfide since fluidity of the slurry (I) obtained in the step 1 is improved, and also the reactivity and polymerizability in the step 2 are excellent when the polyhaloaromatic compound (a) is used as the non-hydrolyzable organic solvent. The polyhaloaromatic compound (a) is used as it is in the subsequent process for production of PAS, and can be optionally added in the subsequent process for production of PAS when the amount is insufficient, while it can be removed when the amount is excessive.

It is also possible to obtain a copolymer containing two or more kinds of different reaction units by selecting proper combination of the polyhaloaromatic compounds (a). For example, it is particularly preferred to use p-dichlorobenzene and 4,4'-dichlorobenzophenone or 4,4'-dichlorodephenylsulfone in combination since polyarylene sulfide having excellent thermal resistance is obtained.

Examples of the hydrous alkali metal sulfide used in the step 1 of the method 3-A include liquid or solid hydrates of compounds such as lithium sulfide, sodium sulfide, potassium sulfide, rubidium sulfide, and cesium sulfide, and the solid content thereof is preferably within a range from 10 to 80 wt %, preferably from 35 to 65 wt %.

Among these, the use of a lithium sulfide hydrate is preferred since it can be used as a lithium ion source in the step 2, and a sodium sulfide hydrate is preferred in terms of reactivity.

In the step 1, the production of the solid alkali metal sulfide is further promoted by performing a dehydration treatment through the addition of an alkali metal hydroxide, in addition to the hydrous alkali metal sulfide.

In contrast, examples of the hydrous alkali metal hydrosulfide used in the step 1 of the method 3-B include liquid or solid hydrates of compounds such as lithium hydrosulfide, sodium hydrosulfide, potassium hydrosulfide, rubidium hydrosulfide, and cesium hydrosulfide, and the solid content thereof is preferably within a range from 10 to 80 wt %. Among these, hydrates of lithium hydrosulfide and sodium hydrosulfide are preferred, and a hydrate of sodium hydrosulfide is particularly preferred.

Examples of the alkali metal hydroxide used in the step 1 of the method 3-B include lithium hydroxide, sodium hydroxide, potassium hydroxide, rubidium hydroxide, cesium hydroxide, and aqueous solutions thereof. When the aqueous solution is used, an aqueous solution having a concentration of 20 wt % or more is preferred since it is easy to conduct a dehydration treatment in the step 1. Among these, lithium hydroxide, sodium hydroxide, and potassium hydroxide are preferred, and sodium hydroxide is particularly preferred. The amount of the alkali metal hydroxide to be used is preferably within a range from 0.8 to 1.2 mol, and particularly preferably from 0.9 to 1.1 mol, per mol of the alkali metal hydrosulfide (b) since the production of the solid alkali metal sulfide is promoted.

Specific examples of the method for performing the dehydration treatment in the step 1 include the following methods 3-A and 3-B.

The method 3-A of:
charging an aliphatic cyclic compound (c1) that is capable of ring-opening by hydrolysis, a non-hydrolyzable organic solvent, a hydrous alkali metal sulfide, and an alkali metal hydroxide (if necessary) in a reaction vessel in respective predetermined amounts, and dehydrating by heating the reaction solution to a temperature which is higher than a boiling point of the hydrous alkali metal sulfide and also enables removal of water through azeotropy, for example, a temperature within a range from 80 to 220° C., and preferably from 100 to 200° C.

The method 3-B of:
charging an aliphatic cyclic compound (c1) that is capable of ring-opening by hydrolysis, a non-hydrolyzable organic solvent, a hydrous alkali metal hydrosulfide (b), and an alkali metal hydroxide in a reaction vessel in respective predetermined amounts, producing a hydrous alkali metal hydrosulfide nearly simultaneously with charging, and dehydrating by heating the reaction solution to a temperature which is higher than a boiling point of the hydrous alkali metal sulfide and also enables removal of water through azeotropy, for example, a temperature within a range from 80 to 220° C., and preferably from 100 to 200° C.

In the step 1 of the methods 3-A and 3-B, water and a non-hydrolyzable organic solvent, which war obtained by azeotropic distillation, are separated by a decanter, and then only the non-hydrolyzable organic solvent may be returned in the reaction system, or the non-hydrolyzable organic solvent may be additionally charged in an amount equivalent to the amount distilled by azeotropic distillation, or the non-hydrolyzable organic solvent can be excessively charged in an amount more than that distilled-off by azeotropic distillation in advance. In the present invention, the method 3-B is particularly preferred since it is easy to prepare the slurry and remarkable effects of the present invention are exerted.

The reaction system is composed of two layers of the polyhaloaromatic compound (a) and the melted hydrous alkali metal sulfide at the initial stage of dehydration. As the dehydration proceeds, an anhydrous alkali metal sulfide is precipitated in the form of fine particles and is uniformly dispersed in the non-hydrolyzable organic solvent. Furthermore, the dehydration treatment is continuously performed until almost all of the aliphatic cyclic compounds (c1) that are capable of ring-opening are hydrolyzed by hydrolysis in the reaction system.

Thus, the step 1 of the present invention is a step in which water is discharged out of the reaction system by a dehydration treatment, the compound (c1) having an aliphatic cyclic structure that is capable of ring-opening by hydrolysis is hydrolyzed, and at the same time, an anhydrous solid alkali metal sulfide is precipitated. Therefore, when excessive moisture is present in the reaction system and the aliphatic cyclic compound (c1) that is capable of ring-opening by hydrolysis is added furthermore in the step 2, a large amount of the alkali metal salt as a hydrolysate of the aliphatic cyclic compound (c1) is produced, to cause the side reaction, and thus the production of the objective PAS having a higher molecular weight is likely to be suppressed. Therefore, it is preferred that the moisture content in the reaction system is as low as possible after the dehydration treatment in the step 1. Specifically, the content of the solid alkali metal sulfide in the finally obtained slurry is within a range from 0.1 to 0.99 mol, and preferably from 0.6 to 0.96 mol, per mol of the hydrous alkali metal sulfide used in the step 1. It is particularly preferred that the reaction system contains substantially no moisture.

Also, the content of the solid alkali metal sulfide in the slurry (I) obtained in the step 1 is preferably from 0.1 to 0.99 mol per mol of the hydrous alkali metal sulfide (method 3-A) or the hydrous alkali metal hydrosulfide (method 3-B) used in the step 1, since operability in the subsequent step 2 is good and remarkable effects of increasing the molecular weight of PAS are attained.

The slurry obtained in the step 1 is subsequently subjected to the reaction with the polyhaloaromatic compound (a), the alkali metal hydrosulfide (b), and the alkali metal salt (c2) of the hydrolysate of the aliphatic cyclic compound (c1) in the step 2. The present invention is characterized in that the aforementioned reaction and the following polymerization reaction for the production of the PAS are conducted in the presence of a lithium ion (refer to the following scheme (2)).

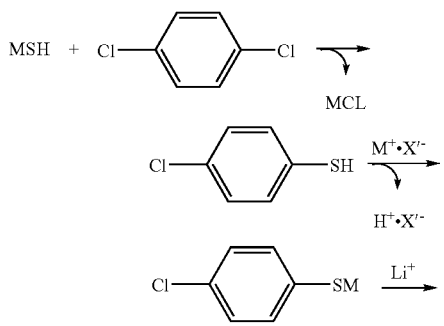

-continued

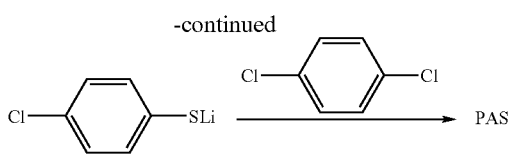

(In the Scheme, M Represents an Alkali Metal Atom.)

The polyhaloaromatic compound (a) in the reaction of the step 2 may be added into the reaction system in the step 2. However, as described above, when the polyhaloaromatic compound (a) is used as non-hydrolyzable organic solvent in the step 1, the reaction of the step 2 can be carried out without change.

The reaction in the step 2 can be carried out using the alkali metal hydrosulfide (b), as it is, which exists in the slurry through the step 1.

After completion of the reaction of the polyhaloaromatic compound (a), the alkali metal hydrosulfide (b), and the alkali metal salt (c2) of the hydrolysate of the aliphatic cyclic compound (c1), the hydrolysate of the aliphatic cyclic compound (c1) associated with the reaction may be ring-closed to release water, which dissolves the solid alkali metal sulfide in the slurry to produce an alkali metal hydrosulfide (b) once again as is shown in the following scheme (3); or the hydrolysate of the aliphatic cyclic compound (c1) associated with the reaction may be subjected to ion exchange reaction with the solid alkali metal sulfide in the slurry to produce an alkali metal hydrosulfide (b) once again as is shown in the following scheme (4). Thus, the polymerization reaction shown in the above formula (2) is allowed to proceed.

Through the cycle of the reaction in the step 2, the solid alkali metal sulfide is gradually converted into a required amount of alkali metal hydrosulfide (b) and alkali metal salt (c2) of a hydrolysate of the compound (c1), and thus the side reaction is suppressed.

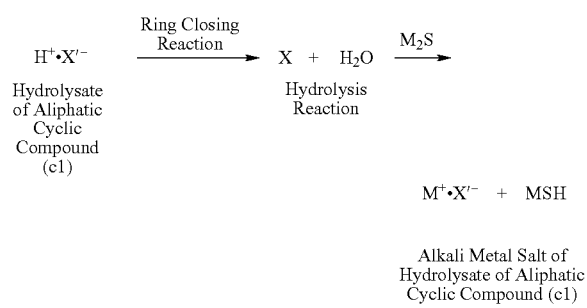

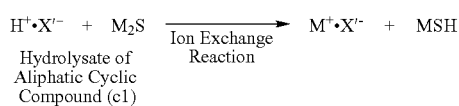

In the present invention, since the reaction and polymerization in the step 2 proceed through the cycle of hydrolysis of the aliphatic cyclic compound (c1), subsequent release of water by ring-closing, or the cycle of hydrolysis of the aliphatic cyclic compound (c1), subsequent ion exchange reaction of the hydrolysate with the solid alkali metal sulfide, it is not necessary to add water into the reaction system in the step 2. However, in the present invention, it is preferred to add water in the amount that satisfies the potential moisture content in the reaction system to be less than an equivalent in total of the hydrous alkali metal sulfide or hydrous alkali metal hydrosulfide used in the step 1, preferably within a range from 0.02 to 0.9 mol, and more preferably from 0.04 to 0.4 mol, per mol of the hydrous alkali metal sulfide or hydrous alkali metal hydrosulfide so as to promote the dissolution of the solid alkali metal sulfide in the slurry.

When a lithium compound is used as the hydrous alkali metal sulfide, or hydrous alkali metal hydrosulfide or alkali metal hydroxide in the step 1, the aforementioned lithium ion may be the lithium ions attributed to these compounds. However, in the present invention, it is preferred to use sodium compounds as the alkali metal hydrosulfide (b) and the alkali metal hydroxide in the step 1 and to add a lithium salt compound that is capable of releasing lithium ions as a lithium ion source into the slurry in the reaction system in the step 2 since the effects of the present invention are remarkably exerted.

Examples of the lithium salt compound used herein include inorganic lithium salt compounds such as lithium fluoride, lithium chloride, lithium bromide, lithium iodide, lithium carbonate, lithium hydrogen carbonate, lithium sulfate, lithium hydrogen sulfate, lithium phosphate, lithium hydrogen phosphate, lithium dihydrogen phosphate, lithium nitrite, lithium sulfite, lithium chlorate, lithium chromate, lithium molybdate, lithium formate, lithium acetate, lithium oxalate, lithium malonate, lithium propionate, lithium butyrate, lithium isobutyrate, lithium maleate, lithium fumarate, lithium butanedioate, lithium valerianate, lithium hexanoate, lithium octanoate, lithium tartrate, lithium stearate, lithium oleate, lithium benzoate, lithium phthalate, lithium benzenesulfonate, lithium p-toluenesulfonate, lithium sulfide, lithium hydrosulfide, and lithium hydroxide; and organic lithium salt compounds such as lithium methoxide, lithium ethoxide, lithium propoxide, lithium isopropoxide, lithium butoxide and lithium phenoxide. Among these compounds, lithium chloride and lithium acetate are preferred, and lithium chloride is particularly preferred. Further, the lithium salt compounds can be used in the form of an anhydride, a hydrate or an aqueous solution.

The amount of lithium ions in the reaction system of the step 2 is preferably within a range from 0.01 to 0.9 mol, and particularly preferably from 0.1 to 0.4 mol, when the total molar number of the hydrous alkali metal sulfide or hydrous alkali metal hydrosulfide used in the step 1 and the sulfiding agent added later is 1 mol since the effects of improving reactivity in the step 2 are markedly exerted.

As described above, the alkali metal hydrosulfide (b) as a raw material for the reaction and polymerization in the step 2, is sequentially supplied to the reaction system by gradually converting the solid alkali metal sulfide in the slurry into the alkali metal hydrosulfide (b), and, if necessary, the alkali metal hydrosulfide (b) may be separately added at any stage of the step 2. Examples of the alkali metal hydrosulfide (b) which can be used herein include lithium hydrosulfide, sodium hydrosulfide, potassium hydroxide, rubidium hydrosulfide, cesium hydrosulfide, and hydrates thereof. Among these, lithium hydrosulfide and sodium hydrosulfide are preferred, and sodium hydrosulfide is particularly preferred.

It is possible to add a small amount of alkali metal hydroxide so as to react with an alkali metal hydrosulfide (b) and alkali metal thiosulfate which exist in small amounts in the alkali metal sulfide which constitutes the solid component of the slurry.

A specific method for carrying out the reaction and polymerization in the step 2 includes adding, to the slurry obtained through the step 1, water, the polyhaloaromatic compound (a), the alkali metal hydrosulfide (b), an organic solvent, and the lithium salt compound according to need; and carrying out reaction/polymerization at 180 to 300° C., preferably at 200 to 280° C. The polymerization reaction can be carried out at a constant temperature, but it can also be carried out by raising the temperature stepwise or continuously.

In the present invention, as described above, it is preferred to use a lithium salt compound as a lithium ion source. The timing of the addition of the lithium salt compound to the reaction system is preferably after the completion of the dehydration step of the step 1 and before the reaction of the step 2 since the effects of improving reactivity due to a lithium ion are remarkably exerted.

The amount of the polyhaloaromatic compound (a) in the step 2 is preferably within a range from 0.8 to 1.2 mol, and particularly preferably from 0.9 to 1.1 mol, per mol of a sulfur atom in the reaction system since a higher molecular weight PAS can be obtained.

It is also possible to add the aliphatic cyclic compound (c1) as an organic solvent in the reaction/polymerization reaction in the step 2. Although the total amount of the aliphatic cyclic compound (c1) existing in the reaction is not particularly limited, it is preferred to add the aliphatic cyclic compound (c1) within a range from 0.6 to 10 mol per mol of a sulfur atom existing in the reaction system, and it is more preferred to add it within a range from 2.0 to 6.0 mol, since making it more feasible to obtain a higher molecular weight PAS. In terms of an increase in the concentration of reactants per volume of a polymerization reactor, the amount is preferably within a range from 1.0 to 3.0 mol based on 1 mol of a sulfur atom existing in the reaction system.

In the reaction/polymerization in the step 2, the water content in the reaction system becomes substantially anhydrous in the initial stage. In other words, the water to be subjected to hydrolysis of the aliphatic cyclic compound (c1) in the dehydration step of the step 1, and the water to be optionally added and subjected to hydrolysis of the compound (c1) are, as described above, released as a result of a ring-closing reaction of the hydrolysate, and simultaneously used for generation of the alkali metal hydrosulfide (b) and hydrolysis of the compound (c1) once again, or the hydrolysate of the aliphatic cyclic compound (c1) is subjected to the ion exchange reaction with the solid alkali metal sulfide in the form of hydrolysate. Therefore, water apparently does not exist in the reaction system, but it is apparently getting observed in the reaction system from the point when the solid component in the slurry disappears since hydrolysis of the compound (c1) does not proceed any more.

Accordingly, it is preferred that the polymer slurry substantially take an anhydrous condition at the point when a consumption rate of the solid alkali metal sulfide is 10% in the step 2 of the present invention.

Examples of the device which can be used for dehydration treatment in the step 1 include a dehydration vessel equipped with a stirrer, a distillation line, a condenser, a decanter, a distillate return line, an exhaust line, a hydrogen sulfide capture unit, and a heater. The reactor used for the dehydration treatment in the step 1 and the reaction/polymerization in the step 2 is not particularly limited, but it is preferred to use a reactor whose liquid contact portion is made of titanium, chromium, or zirconium.

A common polymerization method such as a batch system or continuous system can be applied to the respective steps of the dehydration treatment in the step 1 and the reaction/polymerization in the step 2. It is preferred to carry out both dehydration step and polymerization step under the atmosphere of an inert gas. Examples of the inert gas include nitrogen, helium, neon, and argon. Among these, nitrogen is preferred considering economical efficiency and easy handling.

The post-treatment method of the reaction mixture containing PAS obtained by the polymerization step is not particularly limited, but includes (1) a method including subjecting, after completing a polymerization reaction, the reaction mixture to distillation for removing the solvent under reduced or atmospheric pressure as it is or after adding an acid or a base, washing a solid substance after distilling off the solvent once, or twice or more times with a solvent such as water, acetone, methyl ethyl ketone or alcohols, and conducting neutralization of the solid, washing with water, filtration, and drying; (2) a method including adding, after completing a polymerization reaction, a solvent such as water, acetone, methyl ethyl ketone, alcohols, ethers, halogenated hydrocarbon, aromatic hydrocarbon, or aliphatic hydrocarbon (a solvent which is soluble with the solvent used for the polymerization and also a poor solvent at least to PAS) to the reaction mixture as a precipitating agent to precipitate solid products such as PAS and an inorganic salt, and conducting separation of the solid products by filtration, washing, and drying; or (3) a method including adding, after completing a polymerization reaction, the reaction mixture to the reaction solvent (or an organic solvent whose solubility to low molecular weight polymers is equivalent to the reaction solvent) followed by stirring, filtering to remove a low molecular weight polymer, washing the residue once, or twice or more times with a solvent such as water, acetone, methyl ethyl ketone or alcohols, and conducting neutralization, washing with water, filtration, and drying.

In the post-treatment method shown in the above-described (1) to (3), the drying step of the PAS can be performed under vacuum, or under the air or an atmosphere of an inert gas such as nitrogen.

The PAS obtained in the above way can be used as it is for various molding materials, or be subjected to oxidative crosslinking after subjecting to a heat treatment in the air, in the air rich in oxygen or under reduced pressure. The temperature of the heat treatment varies depending on the target time of a cross-linking treatment and atmosphere for the treatment, but is preferably within a range from 180° C. to 270° C. The heat treatment can be carried out using an extruder at a temperature higher than a melting point of the PAS, where the PAS is in a melting state, but it is preferred to do it at a temperature of the melting point plus 100° C. or lower so as to avoid possible thermal degradation of PAS.

The PAS obtained by the method of the present invention described above in detail can be processed into moldings having excellent heat resistance, moldability and dimensional stability by various melt processing methods such as injection molding, extrusion molding, compression molding, and blow molding.

It is also possible to use the PAS obtained by the present invention in a form of a PAS composition by combining it with various fillers so as to improve such performances as strength, heat resistance and dimensional stability. The filler is not particularly limited, but examples thereof include fibrous fillers and inorganic fillers. Examples of the fibrous filler include fibers such as fiberglass, carbon fiber, silane glass fiber, ceramic fiber, aramid fiber, metal fiber, potassium titanate fiber, silicon carbide fiber, calcium sulfate fiber, and calcium silicate fiber; and natural fibers such as wollastonite. Examples of the inorganic filler include barium sulfate, calcium sulfate, clay, pyroferrite, bentonite, sericite, zeolite, mica, isinglass, talc, atarpargite, ferrite, calcium silicate, calcium carbonate, magnesium carbonate, and glass beads. In the mold processing, the following additives can be added, such as releasing agents, colorants, heat stabilizers, UV stabilizers, foaming agents, corrosion inhibitors, flame retarders, and lubricants.

Further, the PAS obtained by the present invention may be used as PAS composition blended properly with synthetic such as polyester, polyamide, polyimide, polyether imide, polycarbonate, polyphenylene ether, polysulfone, polyether sulfone, polyether ether ketone, polyether ketone, polyarylene, polyethylene, polypropylene, polytetrafluoroethylene, polydifluoroethylene, polystyrene, ABS resin, epoxy resin, silicone, phenol resin, urethane resin and liquid crystal polymer, or elastomers such as polyolefin rubber, fluorine rubber and silicon rubber, according to the application.

Since the PAS obtained by the production method of the present invention has various functions that the PAS possesses by nature, such as heat resistance and dimensional stability, it is useful for a wide variety of applications, including electric/electronic components such as connecters, printed circuit boards and sealing products; car components such as lamp reflectors and electrical components; interior materials for buildings, aircrafts and automobiles; materials for injection or compression moldings of precision components such as OA equipment, camera and watch; materials for extrusion or pultrusion moldings such as composites, sheets and pipes; and materials for fibers or films.

EXAMPLES

The present invention will now be described in more detail by way of Examples, but is not limited by only these Examples.
(Measurement of Melt Viscosity)

The melt viscosity (η) of the resultant polymer is a value measured after retaining it at 300° C. under 20 kgf/cm$^2$ at L/D=10 for 6 minutes, using a flow tester manufactured by Shimadzu Corp.

Example 1

(Dehydration Step: Production Step of Anhydrous Sodium Sulfide Composition)

220.5 g (1.5 mol) of p-dichlorobenzene (hereinafter abbreviated as p-DCB), 29.7 g (0.3 mol) of NMP, 123.6 g (1.5 mol) of an aqueous 68 wt % NaSH solution melted by heating, and 125.0 g (1.5 mol) of an aqueous 48 wt % NaOH solution were charged in a 1 L autoclave lined with zirconium, which was equipped with a mixing impeller and connected with a pressure gauge, a thermometer, a condenser and a decanter, and stirred under a nitrogen atmosphere by gradually raising the temperature to 173° C. over 2 hours. After distilling off 123.5 g of water, the reactor was sealed. At that time, DCB distilled by azeotropy was separated by the decanter, and returned in the reactor as needed. Fine granular anhydrous sodium sulfide composition was dispersed in DCB inside the reactor after completion of dehydration.
(Polymerization Step: Production Step of PPS)

After completion of the dehydration step, the inner temperature was cooled at 160° C., and 416.3 g (4.2 mol) of NMP and 12.7 g (0.3 mol) of lithium chloride were charged thereto. The temperature was raised to 220° C., and the mixture was stirred for 2 hours. Then, the temperature was raised to 250° C., and the mixture was stirred for 1 hour. The final pressure was 0.28 MPa. After cooling, the resultant slurry was added with 3 L of water and stirred at 80° C. for 1 hour and filtered. The resultant cake was stirred again in 3 L of warm water for 1 hour, washed and then filtered. After repeating the same operation 4 times, the cake was dried at 120° C. overnight in a hot-air dryer to obtain 154 g of PPS in a white powder form. The melt viscosity of the polymer was 163 Pa·s at 300° C.

Example 2

The operation was carried out in the same manner as in Example 1, except for using 19.8 g (0.3 mol) of lithium acetate in place of lithium chloride in the polymerization step. 154 g of PPS was obtained in a white powder form. The melt viscosity of the polymer was 141 Pa·s at 300° C.

Comparative Example 1

The operation was carried out in the same manner as in Example 1, except that lithium chloride was not used. 154 g of PPS was obtained in a white powder form.
The melt viscosity of the polymer was 66 Pa·s at 300° C.

Example 3

The operation was carried out in the same manner as in Example 1, except that 565.0 g (5.7 mol) of NMP and 19.0 g (0.45 mol) of lithium chloride were charged, the temperature was gradually raised from 200° C. to 250° C., and the mixture was stirred for 2 hours. 156 g of PPS was obtained in a white powder form. The melt viscosity of the polymer was 532 Pa·s at 300° C.

Comparative Example 2

446.0 g (4.5 mol) of NMP, 123.6 g (1.5 mol) of an aqueous 68 wt % NaSH solution melted by heating, 125.0 g (1.5 mol) of an aqueous 48 wt % NaOH solution, and 12.7 g (0.3 mol) of lithium chloride were charged in a 1 L autoclave lined with zirconium, which was equipped with a mixing impeller and connected with a pressure gauge, a thermometer, and a condenser, and the temperature was raised to 205° C. under a nitrogen atmosphere while stirring the mixture. Then, 101.9 g of water was distilled off. Thereafter, the reaction system was sealed, the inner temperature was reduced to 160° C., and 220.5 g (1.5 mol) of p-DCB was charged. Then, the temperature was raised to 250° C., and the mixture was stirred for 1 hour. The final pressure was 0.88 MPa. After cooling, the resultant slurry was added to 3 L of water, stirred at 80° C. for 1 hour, and filtered. The resultant cake was stirred again in 3 L of warm water for 1 hour, washed, and then filtered. The same operation was repeated 4 times. After filtration, the cake was dried at 120° C. overnight in a hot-air drier to obtain 154 g of PPS in a white powder form. The melt viscosity of the polymer was 30 Pa·s at 300° C.

The invention claimed is:

1. A method for producing a polyarylene sulfide, comprising a reaction step of reacting a polyhaloaromatic compound (a), an alkali metal hydrosulfide (b), and an alkali metal carboxylate (c) in the presence of a uniformly dispersed fine granular solid alkali metal sulfide and a lithium ion, wherein
the alkali metal carboxylate (c) is an alkali metal salt (c2) of a hydrolysate of an aliphatic cyclic compound (c1) that is capable of ring-opening by hydrolysis.

2. The method for producing a polyarylene sulfide according to claim 1, wherein the reaction step comprises, as essential production steps, steps 1 and 2 shown below:
the step 1 of:

reacting, while dehydrating, a hydrous alkali metal sulfide, or a hydrous alkali metal hydrosulfide and an alkali metal hydroxide, the aliphatic cyclic compound (c1) that is capable of ring-opening by hydrolysis, and a non-hydrolyzable organic solvent, to form a slurry (I) that contains the fine granular solid alkali metal sulfide, the alkali metal hydrosulfide (b), and the alkali metal salt (c2) of the hydrolysate of the aliphatic cyclic compound (c1); and subsequently the step 2 of:

reacting, in the slurry (I), the polyhaloaromatic compound (a), the alkali metal hydrosulfide (b), and the alkali metal salt (c2) of the hydrolysate of the aliphatic cyclic compound (c1) in the presence of the lithium ion, to perform polymerization.

3. The method for producing a polyarylene sulfide according to claim 2, wherein the non-hydrolyzable organic solvent is the polyhaloaromatic compound (a).

4. The method for producing a polyarylene sulfide according to claim 2, wherein, in the step 1, the aliphatic cyclic compound (c1) that is capable of ring-opening by hydrolysis is used in an amount within a range from 0.01 to 0.9 mol per mol of the hydrous alkali metal sulfide.

5. The method for producing a polyarylene sulfide according to claim 2, wherein, after the completion of the step 1, a lithium salt compound is added into the slurry (I), and then the reaction in the step 2 is started.

6. The method for producing a polyarylene sulfide according to claim 5, wherein an amount of the lithium salt compound is within a range from 0.01 to 0.9 mol per mol of the alkali metal sulfide used in the step 1.

7. The method for producing a polyarylene sulfide according to claim 2, wherein the content of the fine granular solid alkali metal sulfide in the slurry (I) obtained in the step 1 is within a range from 0.1 to 0.99 mol per mol of the hydrous alkali metal sulfide used in the step 1.

8. The method for producing a polyarylene sulfide according to claim 6, wherein a polymer slurry is substantially in an anhydrous state when a consumption rate of the fine granular solid alkali metal sulfide in the step 2 is 10%.

9. The method for producing a polyarylene sulfide according to claim 2, wherein, after the completion of the step 1, the aliphatic cyclic compound (c1) that is capable of ring-opening by hydrolysis is further added so that a total amount of the aliphatic cyclic compound (c1) is within a range from 0.6 to 10 mol per mol of a sulfur atom existing in a reaction system.

10. The method for producing a polyarylene sulfide according to claim 2, wherein the fine granular solid alkali metal sulfide is dispersed in the non-hydrolyzable organic solvent to form the slurry (I).

* * * * *